United States Patent
Gabor

(10) Patent No.: US 8,706,979 B2
(45) Date of Patent: Apr. 22, 2014

(54) CODE REUSE AND LOCALITY HINTING

(75) Inventor: Ron Gabor, Raanana (IL)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 11/967,229

(22) Filed: Dec. 30, 2007

(65) Prior Publication Data
US 2009/0172314 A1    Jul. 2, 2009

(51) Int. Cl.
*G06F 12/12*    (2006.01)
*G06F 12/06*    (2006.01)

(52) U.S. Cl.
USPC .............. 711/156; 711/159; 711/E12.017; 711/E12.069

(58) Field of Classification Search
None
See application file for complete search history.

(56) References Cited

U.S. PATENT DOCUMENTS

| | | | |
|---|---|---|---|
| 6,012,134 A | 1/2000 | McInerney | |
| 6,223,256 B1 * | 4/2001 | Gaither | 711/134 |
| 6,785,784 B1 | 8/2004 | Jing | |
| 7,017,008 B2 | 3/2006 | Fanning | |
| 7,100,155 B1 | 8/2006 | Wu | |
| 7,360,015 B2 | 4/2008 | Matthews | |
| 2004/0154011 A1 * | 8/2004 | Wang et al. | 717/158 |
| 2006/0230235 A1 * | 10/2006 | O'Connor et al. | 711/133 |
| 2007/0150653 A1 | 6/2007 | Cooray | |
| 2008/0244080 A1 | 10/2008 | James | |
| 2009/0172291 A1 | 7/2009 | Sprangle | |

OTHER PUBLICATIONS

U.S. Appl. No. 10/358,618, filed Feb. 3, 2003, to Radhakrishnan.

* cited by examiner

*Primary Examiner* — Denise Tran
(74) *Attorney, Agent, or Firm* — Blakely, Sokoloff, Taylor & Zafman LLP

(57) ABSTRACT

A method and apparatus for handling reusable and non-reusable code is herein described. Page table entries include code reuse and locality fields to hold hints for associated pages. If a code reuse and locality field holds a non-reusable value to indicate an associated page holds non-reusable code, then an instruction decoded from the associated page is not stored in the trace to obtain maximum efficiency and power savings from the trace cache and decode logic.

5 Claims, 3 Drawing Sheets

CODE REUSE AND LOCALITY HINTING

FIELD

This invention relates to the field of cache memories in computer systems and, in particular, to caching based on code reuse and locality hints.

BACKGROUND

Caching is an effective mechanism for increasing performance of processors by temporally storing system memory information for use and modification by the processors. A cache often increases in performance the closer it resides to execution units of a processor. In addition, the caches closer to execution units of a processor typically are smaller and quicker than larger higher-level caches.

However, a fundamental principle of caches is that the data cached is that, at least some of, the data cached is to be reused. Otherwise, a processor would always be accessing memory and the benefit of holding data next to a processor that is not reused would be lost. As an example, a trace cache may be included in a processor to hold decoded instruction traces. A trace cache is typically a fast and small cache utilized to improve performance (frontend and backend) and reduce power (power down decoders). However, contaminating caches with code that will not be reused reduces effectiveness, as space for reusable code is utilized.

Furthermore, optimizers may be included to optimize code. However, similar to the discussion above, execution cycles and power is often wasted on optimizing code that will not be reused.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific processor architecture, cache hierarchies, methods/apparatus for identifying reusable code, methods/apparatus for labeling code as reusable, etc. in order to provide a thorough understanding of the present invention. It will be apparent, however, to one skilled in the art that these specific details need not be employed to practice the present invention. In other instances, well known components or methods, such as address translation utilizing page tables, specific cache organization and design, specific logic implementation, and other specific operation details, have not been described in detail in order to avoid unnecessarily obscuring the present invention.

The method and apparatus described herein are for efficient handling of reusable and non-reusable code. Specifically, handling of reusable and non-reusable code is primarily discussed in reference to a trace cache of a processor. However, the methods and apparatus for handling reusable and non-reusable code are not so limited, as they may be implemented on or in association with any processor system, as well as with any memory hierarchy.

Figure 1:
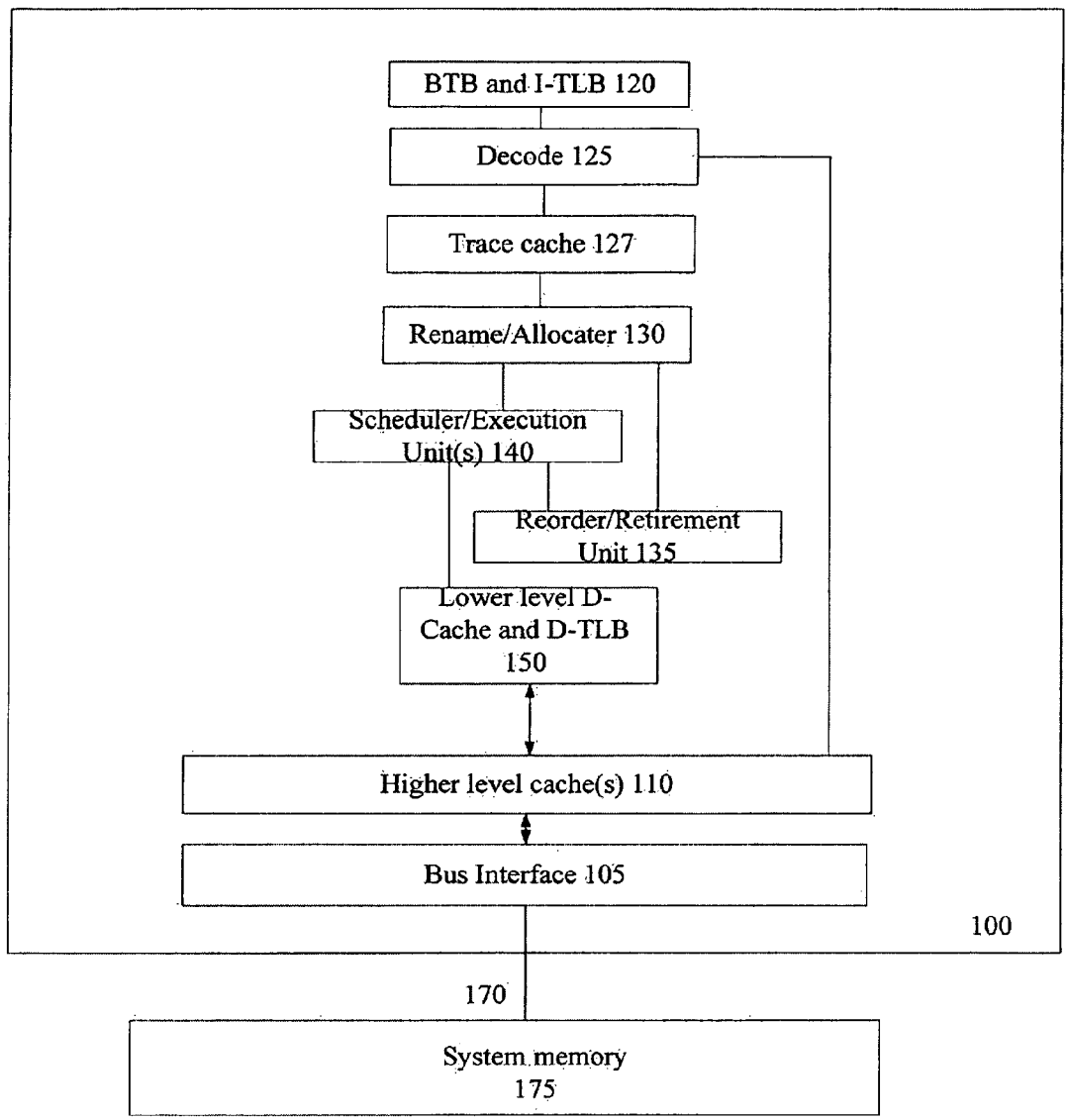
FIG. 1 illustrates an embodiment of a processor including hardware to provided hardware for efficient and low power processing based on code reuse and locality hints.

Referring to FIG. 1, an embodiment of a processor capable of efficiently handling reusable and non-reusable code is illustrated. Although an illustrative portions of a processor pipeline for a single processing element on processor 100 is illustrated, processor 100 may include any other known processor units/organization, as well as any number of processing elements. A processing element refers to a thread, a process, a context, a logical processor, a hardware thread, a core, and/or any processing element, which utilizes resources of the processor, such as reservation units, execution units, pipelines, and/or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources.

An illustrative embodiment of units/modules of processor 100 is illustrated in FIG. 1. Bus interface module 105 is to communicate with devices external to processor 100, such as system memory 175, a chipset, a northbridge, or other integrated circuit. Memory 175 may be dedicated to processor 100 or shared with other devices in a system.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include a first level instruction cache. For instance, an instruction cache stores recently fetched instructions. In one embodiment, where an instruction cache is utilized before decode unit 125, the instructions are not decoded before stored in the instruction cache.

Module 120 potentially includes a branch target buffer to predict branches to be executed/taken and an instruction-translation buffer (I-TLB) to store address translation entries for instructions. Here, a processor capable of speculative execution potentially prefetches and speculatively executes predicted branches. Note, as described below units and modules may at least partially overlap includes portions of other units/modules. As an example, an instruction cache may be referred to as a higher level cache, such as reference to higher level cache 110, but may also me associated with ITLB 120.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed. In one embedment, decode logic 125 decodes instruction bytes of code/instructions held in instruction cache 110 into a plurality of micro-operations. For instance, a read modify write (RMW) instruction may include a load and a store memory access mirco-operations, as well as other non-memory access micro-operations.

Trace cache 127, which may also be referred to as a low-level instruction cache, often refers to any cache to hold instructions after being decoded or as they are retired. In one embodiment, trace caches are utilized to store already decoded micro-operations, or translations of complex instructions, so that the next time an instruction is needed, it does not have to be decoded again. Generally, instructions are added to trace caches in groups representing either any number of sequential basic blocks (including incomplete basic blocks) or dynamic instruction traces. A basic block consists of a group of non-branch instructions ending with a branch. A dynamic trace ("trace path") dynamic trace can be a concatenation of multiple of basic blocks forming dynamic instruction sequences in an order to follow at subsequent times without needing to return to the regular cache or the memory for the same instruction sequence.

In one embodiment of efficiently handling reusable and non-reusable code, trace cache 127 is capable of blocking code from being stored based on code reuse and locality hints. Previously, when traces are built in a trace cache for code that is not reused, then space in the trace cache is taken for traces that may be reused. This potentially results in more misses to the trace cache which leads to longer execution times, i.e. instructions have to be fetched and decoded again. Furthermore, the extra decoding potentially results in extra power consumption due to the inability of powering down the decoders.

However, in this embodiment, if code is determined to be non-reusable code then traces are not built into trace cache 127. As a result, code not to be reused does not replace other frequently used code in trace cache 127. Furthermore, in one embodiment, optimizations are not performed on non-reusable code to save execution cycles for optimization of code that is not likely to be re-used.

Even though a trace cache is described in reference to efficiently handling reusable and non-reusable code, any cache such as a level one instruction cache, a data cache, a level one data cache, a level two data cache, or other cache may not store information, such as instructions or data, based on code reuse and locality hints as describe herein.

Continuing the discussion of the modules/units illustrated in FIG. 1, allocator and renamer block 130 includes an allocator to reserve resources, such as register files to store instruction processing results. However, processor 100 is potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. As a specific example, a processor may include a page table structure to break physical memory into a plurality of virtual pages.

The processor architecture described above is purely illustrative to depict an exemplary architecture for efficient handling of reusable and non-reusable code. However, any processor architecture, computer architecture, or cache memory therein may be utilized to efficiently handle reusable and non-reusable code.

Figure 2:
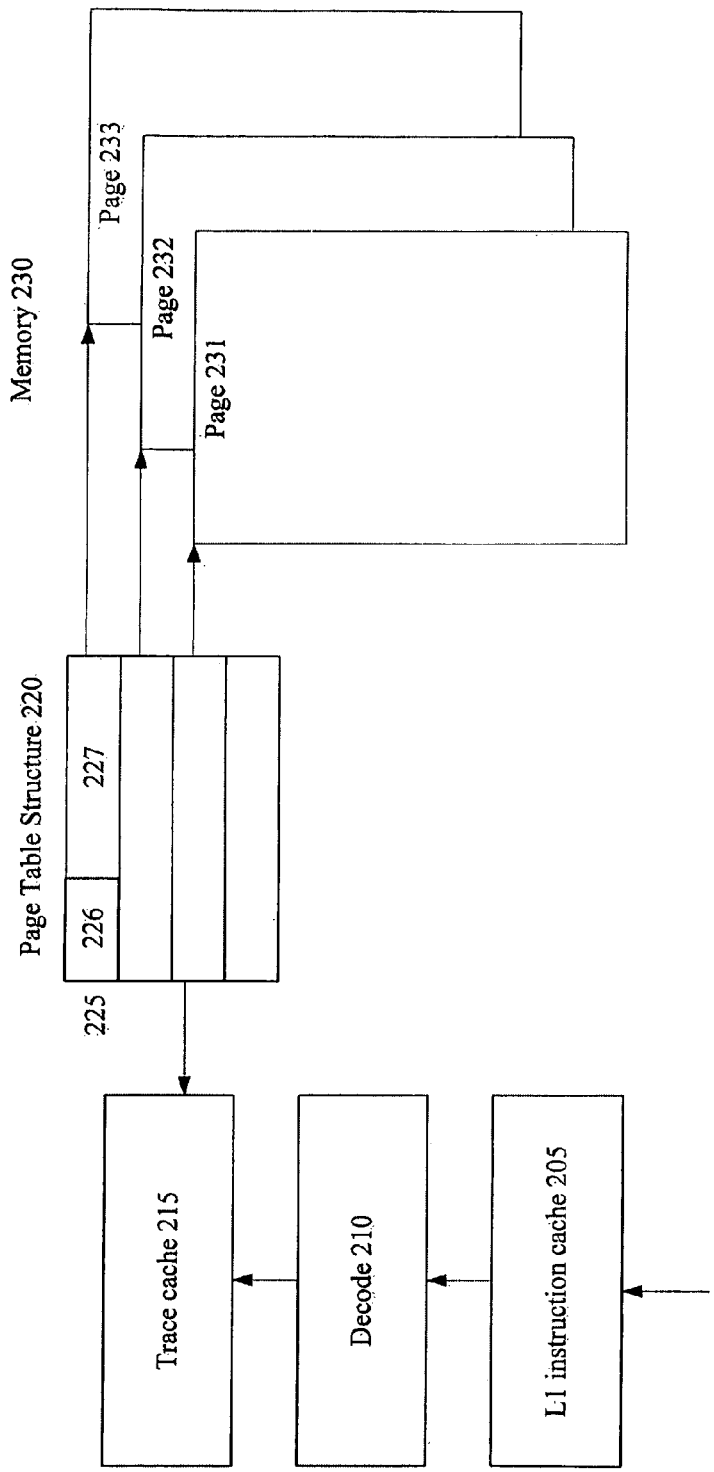
FIG. 2 illustrates an embodiment of logic to provide efficient and low power processing based on code reuse and locality hints.

Referring to FIG. 2, an embodiment of hardware to support handling of reusable and non-reusable code is depicted. In one embodiment, a storage element is to hold a reference to a range of memory. A storage element refers to any storage structure, logic, or module to hold information. As illustrated, a storage element includes page table structure 220, or an entry thereof, such as entry 225. Here, page table entry 225 references page 233 of memory, i.e. a range of memory. However, any reference to any memory location may include a range of memory.

Often a processor maintains a virtual view of memory, i.e. a contiguous abstracted view of physical memory. As illustrated, a processor including page table structure 220 includes page table structure 220 to aid in translation between virtual addresses to physical memory address of memory 230. Each page table entry, such as entry 225 holds information about a page of memory, such as page 233. As an example, an operation may reference an offset from a base address held in entry 225. The offset is added to the base held in entry 225 to obtain the correct physical address of the physical memory location of page 233.

In one embodiment, page table entry 225 includes code reuse and locality hint field 226. Here, field 226 is utilized to hold code reuse and/or locality information about an associated/corresponding page, such as page 233. For instance, field 226 holding a reusable value indicates that corresponding page 233 includes reusable information, such as reusable code/data. When field 226 holds a non-reusable value, it indicates that page 233 holds non-reusable information, such as non-reusable code or data.

In one embodiment, field 226 includes a single storage cell to store a single binary (bit) value. Here, a first value, such as a logical zero, is utilized to represent a reusable value to indicate page 233 holds reusable code, while second value, such as a logical one, is utilized to represent a non-reusable value to indicate page 233 holds non-reusable code.

In another embodiment, where field 226 includes more storage cells/bits, further locality hinting may be included. Locality often refers to a same location or information, as well as related locations or information, being frequently accessed. As examples, locality may refer to temporal locality, i.e. likelihood of information or a location referenced at one time being referenced at a time thereafter, or spatial locality, i.e. likelihood of accessing another location within a spatial proximity of a location. Therefore, code reuse and locality hinting, in one embodiment, refers to hints relating to re-use of code or related code either in a temporal manner or a spatial manner.

As an example, instead of code reuse and locality field 226 including a single bit to reference an entire page, more bits in field 226 may be included to define smaller ranges of memory, i.e. smaller ranges of page 233. In addition, more bits in field 226 may be utilized to define multiple levels of temporal locality, i.e. very frequently accessed, frequently accessed, infrequently accessed, and very infrequently accessed. Therefore, any storage element, such as page table entry 226 in structure 220, may include field 226 to define any combination of code reuse and locality characteristics, as described above.

In one embodiment, a cache, such as trace cache 215, associated with the storage element, is capable of not filling non-reusable information, i.e. low locality information. For instance, in response to a fill request of information from a range of memory marked as non-reusable or low locality, trace cache 215 is not to store the non-reusable information from the range of memory. As stated above, in one embodiment, the locality or code reusability is marked in a field of a page table entry, such as entry 225. Therefore, when code reuse field 226 holds a non-reusable value, information from corresponding page 233 is not built into trace cache 215.

As an oversimplified example, assume an instruction is to be fetched for a processor. The processor initially checks trace cache 215 to see if a decoded version of the instruction is held. In this example, assume a miss occurs in trace cache 215. Next, L1 instruction cache 205 checked, and if a miss occurs here, the instruction is fetched from a location, such as a location within page 233, and provided to instruction cache 205. Decode logic 210 decodes the instruction into a plurality of micro-operations, which here is to be filled into cache 215. However, if field 226 holds a non-reusable value to indicate the information held in page 233 is non-reusable, then trace cache 215 based on the non-reusable value in entry 225, does not build a trace of the plurality of micro-operations into trace cache 215. In contrast, if field 226 holds a reusable value to indicate the code is reusable, then the trace of the plurality of micro-operations is built into trace cache 215.

In one embodiment, control logic for trace cache 215 is capable of determining a value of field 226 for corresponding decoded instructions. As another example, when the instruction is fetched into the L1 cache, the value from field 226 is associated with the instruction and passed to trace cache 215 along with decoded micro-operations.

In addition, in one embodiment, optimization of code may be avoided based on code reuse and locality field 226. For example, some processors include dynamic hardware, firmware, software, and/or micro-code to optimize code, such as traces held in trace cache 215. Therefore, in this example, optimization of non-reusable/low locality code may be avoided. Similar to the example above, if code is within a range of memory, such as a page, then optimization cycles to optimize the code is not wasted, i.e. optimization is not performed on code that is likely to not be reused.

Determining reusability and/or locality of code may be done in any known manner. In one embodiment, software is capable of determining whether code is reusable. As a first example, software includes a compiler that compiles code. Often a compiler, when executed, is to compile language based code into binary code executable by an architecture, such as binary x86 code to execute on Intel Architecture (IA). In addition, during compilation, compiler code often inserts operations, functions, calls to functions, and other programming constructs to perform tasks, which may be supported by the specific architecture for the compiled code to execute on. Often when compiling code, the compiler will replace instructions and operations with other operations and instructions to optimize or provide instructions to take advantage of specialized abilities of hardware, such as the ability of a cache to efficiently handle non-reusable code.

Furthermore, compilers often perform optimizations on code, as well as other compiler tasks. These compilers may utilize any style of analysis, such as dependency graphs, control flows, and other known algorithms or analysis tools to effectively and correctly perform compiler tasks. One such compiler task potentially includes identifying reusable and non-reusable instructions/code. As a result, storage elements, such as page table entries, may be updated with the correct reusable and non-reusable values based on the type of code referenced in the range of memory, as identified by a compiler.

As another example, controlling software, such as an operating system, hypervisor, or other controlling software may identify ranges of memory including reusable code. Note, that controlling software may utilize compiler identifications of reusable and non-reusable code for other applications. Nevertheless, the controlling software potentially updates code reuse and locality fields to indicate whether corresponding memory ranges include reusable or non-reusable code. Moreover, controlling software may identify non-reusable and reusable code based on a type of code. For example, some low locality types of code include virtual machine monitor (VMM) interrupt handlers, certain specific drivers, and large pages resulting in glassjaws. Additionally, controlling software may mark specific code as not-reusable to avoid adverse processing impacts, such as frequent trace cache flushing or performance glassjaws.

In another embodiment, hardware, which may be utilized solely or in combination with software, identifies reusable versus non-reusable code. As an illustrative example, an array or bits in L1 instruction cache 205, tracks reuse of instruction bytes. As a result, code reuse field 226 may be dynamically updated based on the reuse of code within page 233, i.e. the corresponding range of memory. For example, once a predetermined reusage threshold for instruction bytes is reached, page 233 is identified as a non-reusable page of code To illustrate, assume a virtual machine (VM) includes device driver code. Either through compilation, identification by controlling software, such as a hypervisor, or hardware, page 233 is identified as including non-reusable code. As a result, field 226 is updated to a non-reusable value, i.e. a non-reusable hint, to indicate that page 233 includes non-reusable code. Next, an instruction or instruction sequence is fetched from page 233, placed in L1 instruction cache 205, and decoded by decode logic 210 into a plurality of micro-operations. Here, trace cache 215, does not build a trace for the plurality of micro-operations as they are associated with an instruction or sequence of instructions, that are identified as non-reusable, i.e. not likely to be re-used. Furthermore, optimization modules do not waste cycles optimizing the instruction or sequence of instructions based on them being identified as non-reusable.

Above, efficient handling of non-reusable code is discussed in reference to code reuse and locality hint fields in page table entries referencing full pages and a trace cache, which is capable of not caching non-reusable code. However, any storage element, not just a page table structure or entry, may hold code reuse information about locations in memory. Furthermore, any range of memory may be referenced. For example, a code reuse field may reference subsets of pages of memory. As another example, structure in memory, such as a virtual machine (VM), may be referenced by a code reuse field held in a storage element, such as a hypervisor control structure. Moreover, any cache, such as the L1 cache, or a data cache, may be capable of not caching information when identified as not-reusable. For instance, when in a data cache, pages of data may be identified as reusable or non-reusable and cached or not-cached, accordingly.

Figure 3:
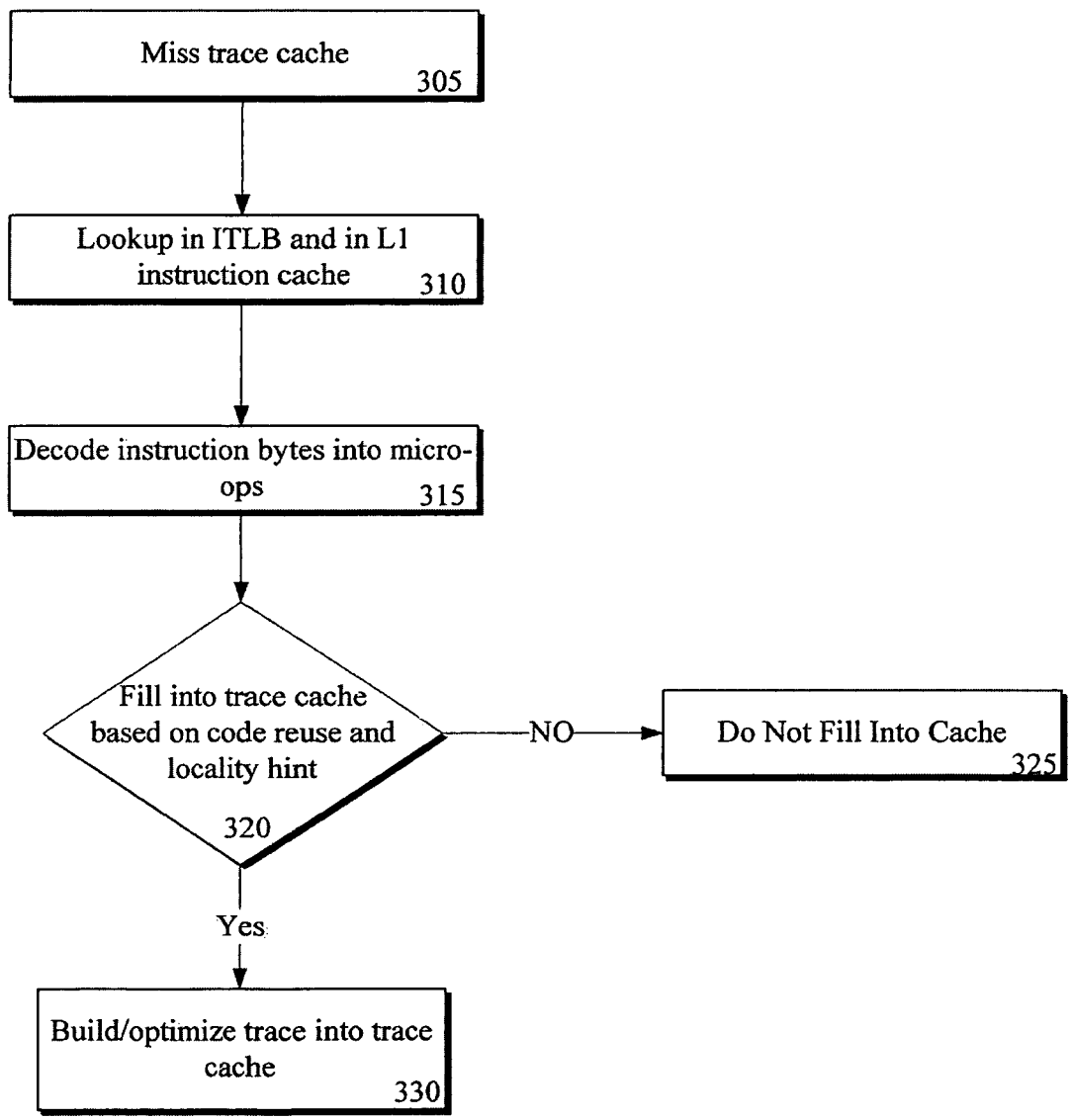
FIG. 3 illustrates an embodiment of a flow diagram for a method of efficiently caching and optimize code reuse and locality hints.

Turning to FIG. 3, an embodiment of a flow diagram for a method of handling non-reusable code in a trace cache is illustrated. Note that the flows in FIG. 3 are illustrated in a substantially serial manner. However, any of the flows may be performed either partially or fully in parallel. Furthermore, the order of the flows is purely illustrative, and any flow is potentially performed in a different order.

In flow 305 a miss to a trace cache occurs. For example, during execution, a trace cache is searched to see if a block or a trace exists for a requested instruction. If the instruction is not found in the trace cache then it is referred to as a miss. In response to a miss, an instruction translation buffer and a level one instruction cache is searched in flow 310. Whether found in the level one instruction cache or retrieved memory and placed in the level one instruction cache, the instruction, at one point, resides in the level one instruction cache. Next, in flow 315, the instruction or sequence of instructions from the level one cache is decoded by decode logic into a plurality of micro-operations.

In flow 320, it is determined if a fill to a trace cache is to be performed based on a code reuse and locality hint. In one embodiment, a code reuse and locality hint is held in a storage element associated with a memory location or range of memory locations to hold the instruction or sequence of instructions to be filled in the cache. Here, the code reuse and locality hint is to indicate whether the instruction is reusable, i.e. high locality. In one embodiment, a locality and reuse field is held in a page table entry.

As an example, if the locality and reuse field holds a first value, such as a reuse value or a high locality value, then the range of memory associated with the field includes reusable/high locality code. As a result, the trace cache is filled in flow 330, accordingly. For instance, a trace is built into the trace cache. In addition, optimization of the plurality of micro-operations held in the trace cache, such as the recently stored trace may be performed by hardware, firmware, microcode, software, or a combination thereof.

In contrast, if the locality and code reuse field holds a second value, such as a non-reusable or low-locality value, then the fill is not performed to the cache in flow 325. Furthermore, optimizations on the code may be avoided. As a result, reusable and high locality code held in the trace cache is not replaced by non-reusable code.

As can be seen from above, hardware in processors may support efficient handling of non-reusable code. A cache, such as an instruction cache, may selectively fill code based on whether it is identified as reusable or non-reusable. Consequently, power may be saved by retaining a maximum amount of reusable code, as decoders and other front-end logic may be powered down. Furthermore, thrashing of a trace cache with low locality code is also potentially avoided, which may result in reduced adverse impacts for an instruction cache, such as frequent flushes and processing glass jaws, being reduced. Furthermore, in an embodiment utilizing learning structures to dynamically learn locality, hinting, as described above, may increase the learning speed and efficiency of the structures.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing us of embodiment and other exemplary language does not necessarily refer to the same embodiment or the same example, but may refer to different and distinct embodiments, as well as potentially the same embodiment.

What is claimed is:
1. A method comprising:
  determining a locality and reuse hint from a locality and reuse field in a page table entry associated with an instruction to be decoded into a trace of decoded micro-operations;

determining whether the trace of decoded micro-operations is to be filled into a cache based on the locality and reuse hint including a value to indicate the trace of decoded micro-operations has high locality or a low locality in response to a cache fill request;

in response to determining that the trace of decoded micro-operations is to be filled into the cache based on the locality and reuse hint having a high locality, building the trace of decoded micro-operations into the cache; and in response to determining that the trace of decoded micro-operations should not be filled into the cache based on the information locality and reuse field holding a low locality, not filling the cache.

2. The method of claim 1, wherein building the trace of decoded micro-operations into the trace cache in response to determining the trace of decoded micro-operations is to be filled into the trace cache based on the information locality and reuse hint further comprises: optimizing the trace of decoded micro-operations.

3. The method of claim 1, wherein the cache fill request is in response to:

missing the trace of decoded micro-operations in the trace cache;

fetching code associated with the trace of decoded micro-operations; and decoding the code into the trace of decoded micro-operations.

4. The method of claim 1, further comprising:

determining the trace of decoded micro-operations has high locality; and updating the trace of decoded micro-operations locality and reuse field in the page table entry associated with the trace of decoded micro-operations to the first value to indicate the trace of decoded micro-operations has high locality.

5. The method of claim 1, further comprising:

determining the trace of decoded micro-operations has low locality; and updating the information locality and reuse field in the page table entry associated with the trace of decoded micro-operations to the second value to indicate the trace of decoded micro-operations has low locality.

* * * * *